April 22, 1941.　　　　G. BUCKY　　　　2,239,379
SELF-FOCUSING AND ILLUMINATING DEVICE FOR PHOTOGRAPHIC CAMERAS
Filed Jan. 12, 1940　　　6 Sheets-Sheet 1
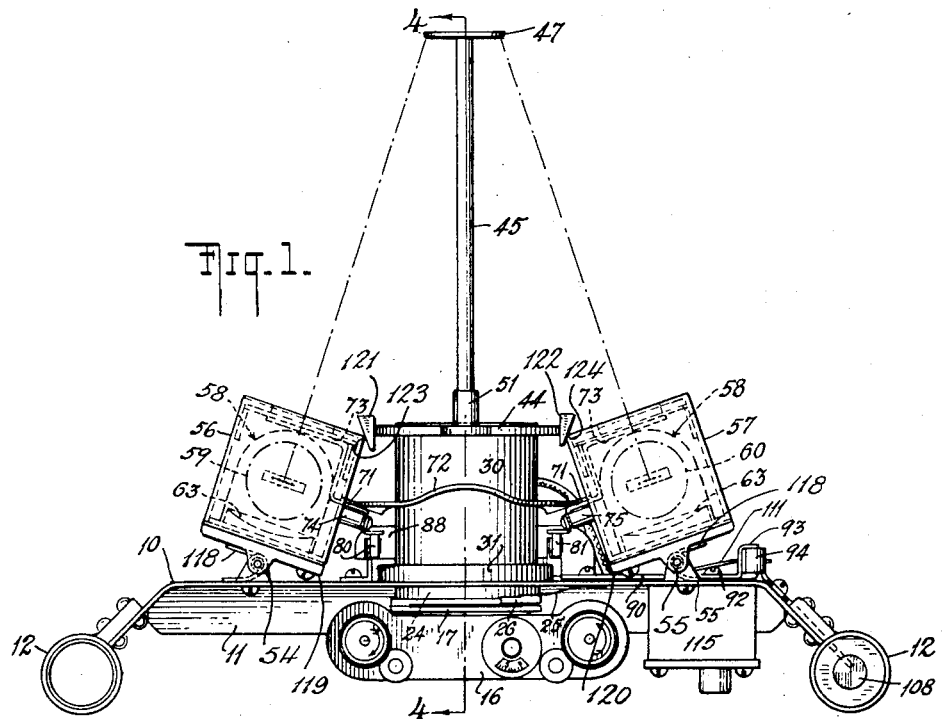
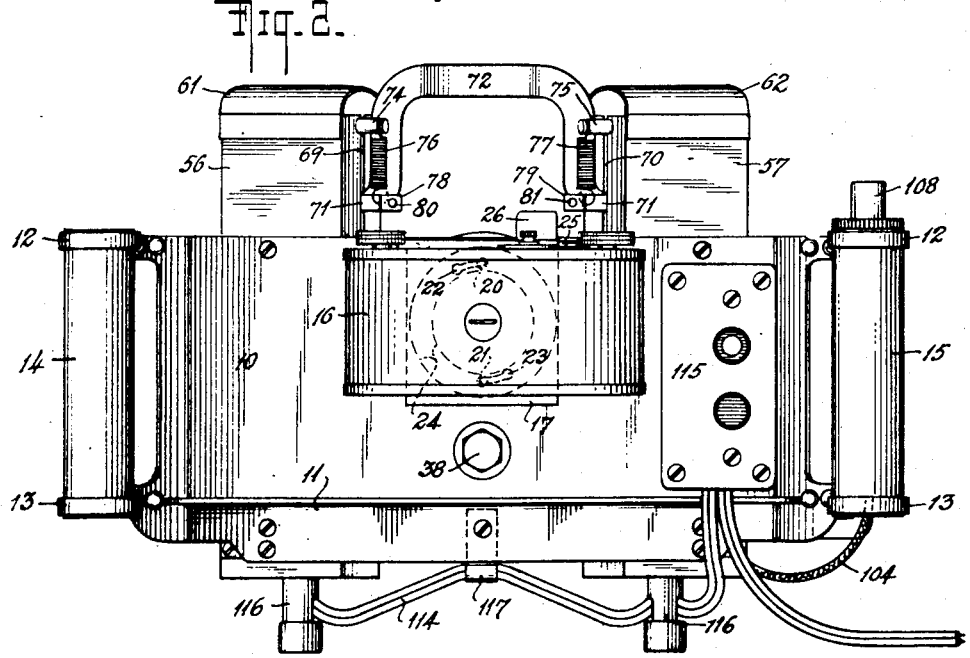
INVENTOR
GUSTAV BUCKY
BY
ATTORNEY April 22, 1941.   G. BUCKY   2,239,379
SELF-FOCUSING AND ILLUMINATING DEVICE FOR PHOTOGRAPHIC CAMERAS
Filed Jan. 12, 1940   6 Sheets-Sheet 2

INVENTOR
GUSTAV BUCKY
BY Walter S. Bleston
ATTORNEY

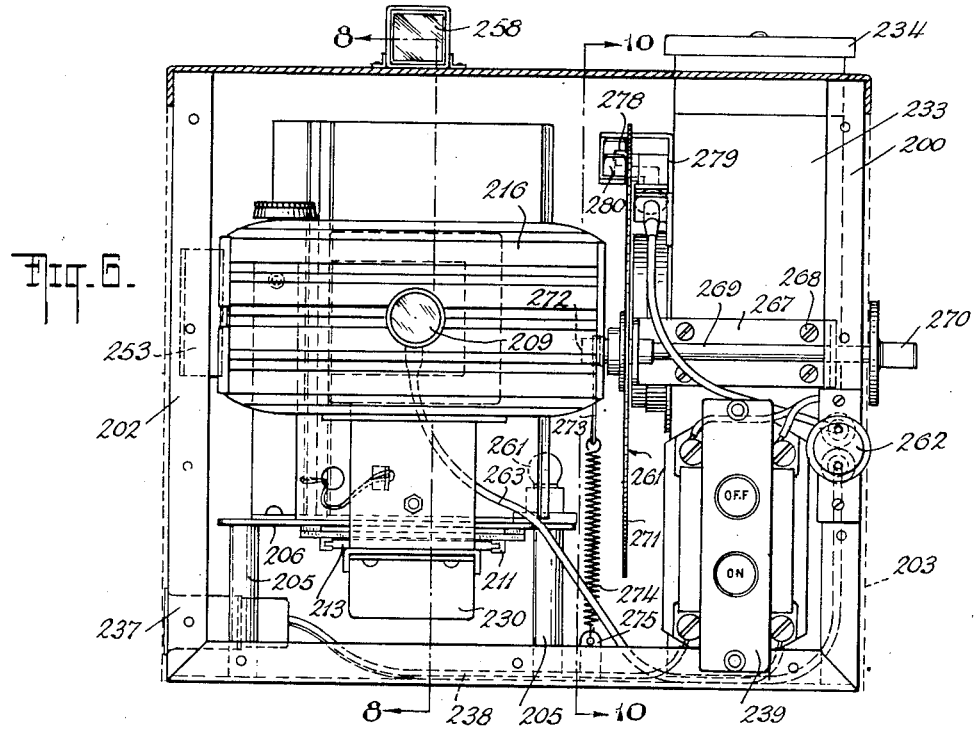
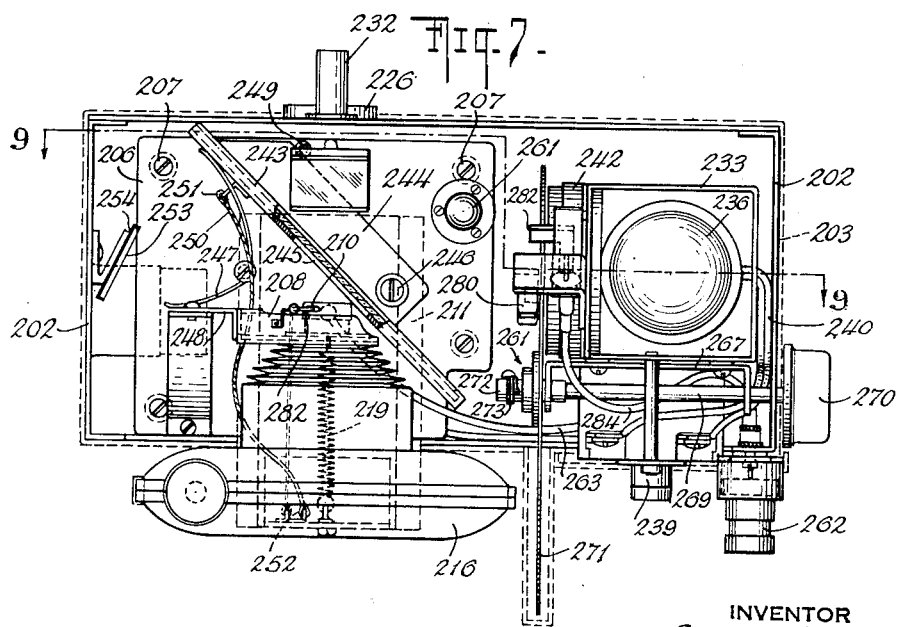

April 22, 1941. G. BUCKY 2,239,379
SELF-FOCUSING AND ILLUMINATING DEVICE FOR PHOTOGRAPHIC CAMERAS
Filed Jan. 12, 1940 6 Sheets-Sheet 4
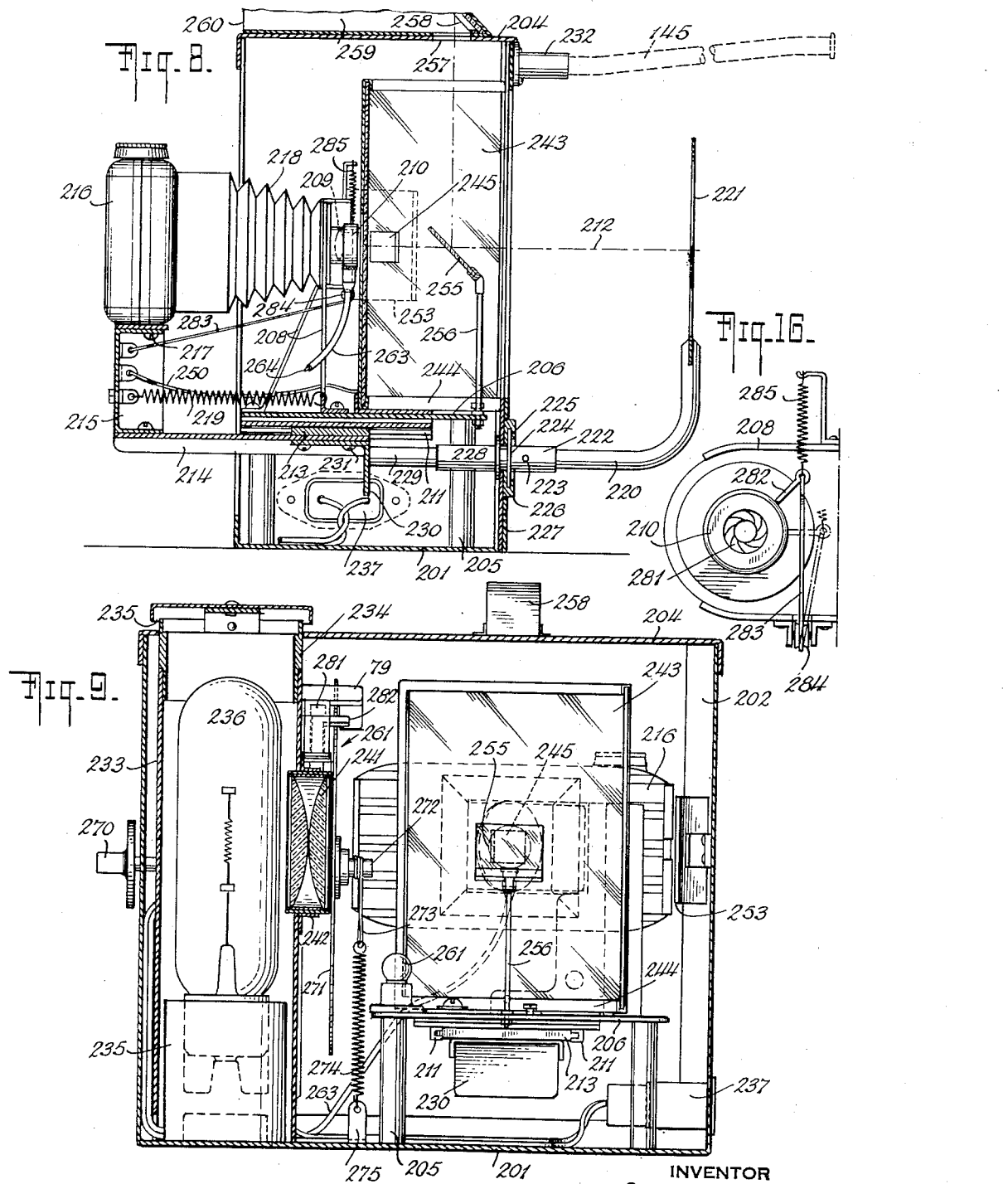
INVENTOR
GUSTAV BUCKY
BY Walter S. Bleston
ATTORNEY April 22, 1941.　　　　　G. BUCKY　　　　　2,239,379
SELF-FOCUSING AND ILLUMINATING DEVICE FOR PHOTOGRAPHIC CAMERAS
Filed Jan. 12, 1940　　　6 Sheets-Sheet 5
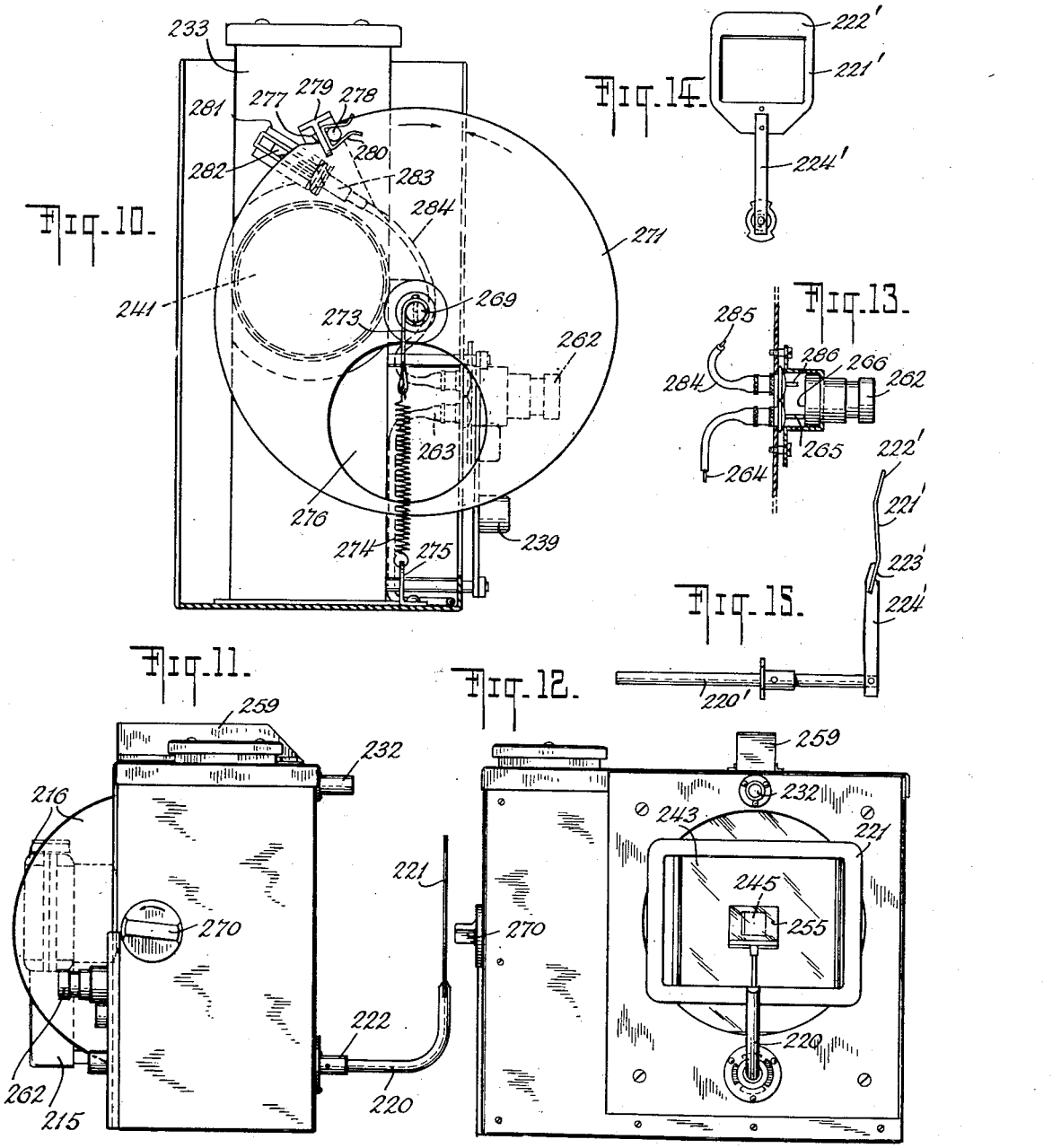
INVENTOR
GUSTAV BUCKY
BY
ATTORNEY

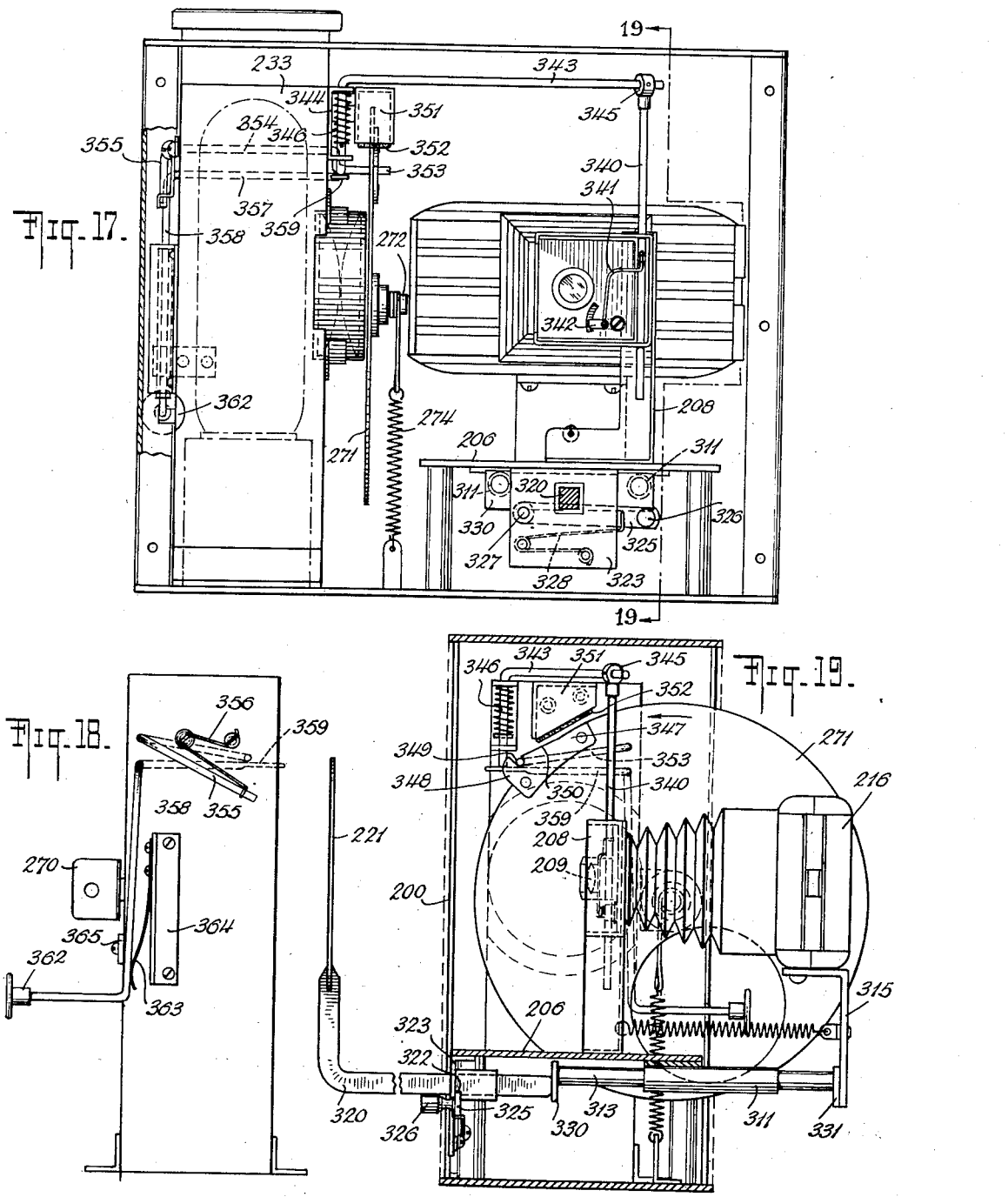

Patented Apr. 22, 1941

2,239,379

UNITED STATES PATENT OFFICE 2,239,379

SELF-FOCUSING AND ILLUMINATING DEVICE FOR PHOTOGRAPHIC CAMERAS

Gustav Bucky, New York, N. Y.

Application January 12, 1940, Serial No. 313,515

19 Claims. (Cl. 95—44)

The invention relates to a device in combination with a photographic camera for automatically focusing the latter. It further relates to means for illuminating the object to be photographed and to accessories requisite in combination with the focusing and illuminating to insure the provision of an adequate quantity of light during an exposure. The present invention is a continuation-in-part of my application No. 225,667 filed August 19, 1938.

Without limiting the applicability of my invention as to other purposes, it is particularly intended to be helpful to a physician in taking photographs of parts of the human body even of interior parts thereof for instance the mouth, for use in the diagnosis of cases of disease or maladjustment, or in the location of foreign matter that may have been lodged e. g. in the eye of a patient. Photographs of the mentioned kind are generally taken at short distances which requires considerable skill on the part of the user in the handling of cameras of conventional type in order to focus the apparatus correctly and to set up the suited lighting conditions including the timing of the shutter, the adjusting of the diaphragm and the finding of the focal distance if the picture taken shall correspond to an object area of a desired size.

My invention aims, therefore, to provide a device in combination with a photographic camera which is practically fool-proof in the hands of an unskilled user, so as to furnish correct focusing and lighting relations when a member determinative of the size of the object area or of the distance thereof has been attached to the apparatus, said member being selective from a group of similar members, respectively correlated to object areas of various sizes.

Consequently, the invention mainly comprises a member selective as to the size or distance of the object area to be photographed, said member embodying means for adjusting the relative distance between the camera objective and the sensitive surface of the plate or film within said camera, and being operative coincidentally with its attachment to said camera.

The invention further consists in illuminating means and means for directing light rays upon the object area of selected size at its correct focal distance in relation to the objective and the sensitive surface.

The invention also consists in means for administering the correct quantity of light to the sensitive surface during the exposure.

Further objects and details of my invention will be apparent from the description hereinafter and the accompanying drawings illustrating two embodiments thereof by way of example. In the drawings Fig. 1 is a plan view of an automatically focused and illuminating camera in the construction of which my invention has been embodied;

Fig. 2 is a rear elevation thereof;

Fig. 6 is a rear elevation of another embodiment;

Fig. 7 is a top plan view thereof;

Fig. 8 is a section on line 8—8 of Fig. 6;

Fig. 9 is a section on line 9—9 of Fig. 7;

Fig. 10 is a section on line 10—10 of Fig. 6;

Figs. 11 and 12 are a side elevation and a front elevation respectively of the embodiment of Fig. 6;

Fig. 13 is an elevation partly in section of a shutter switch;

Figs. 14 and 15 are a front view and a side elevation respectively of the focusing member;

Fig. 16 is a detailed view of the variable diaphragm;

Figs. 17 and 18 are front and side elevations respectively illustrating a modified shutter switch mechanism, and Fig. 19 is a section along line 19—19 of Fig. 17.

Figure 3:
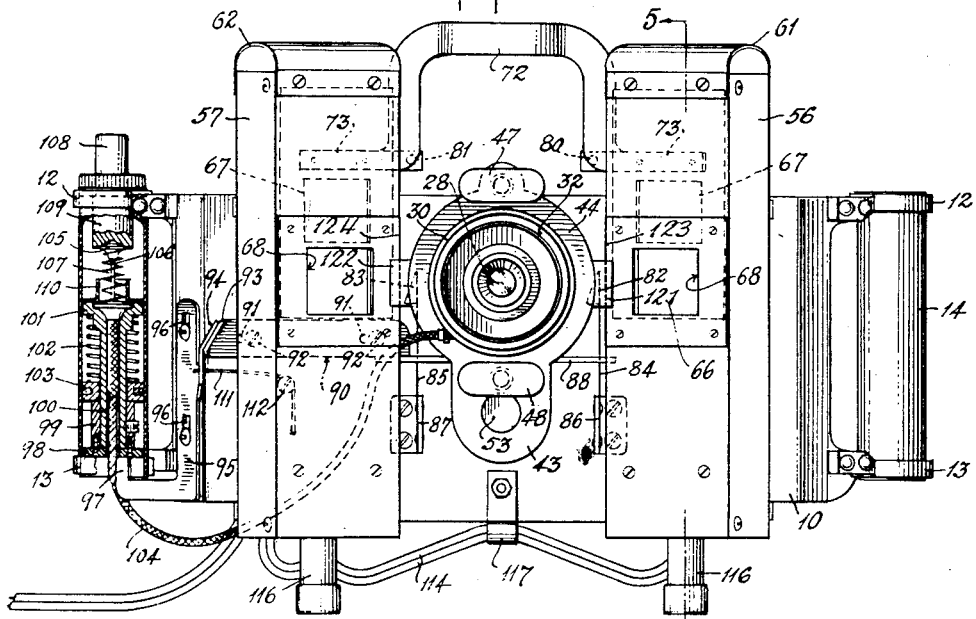
Fig. 3 is a front elevation thereof.

Referring now to the drawings, and more particularly to the embodiment illustrated in Figs. 1 to 5, 10 is a frame of metal or other suitable material secured along its bottom edge to an angle iron bracket 11. The frame has its two end portions disposed angularly towards the rear, to which end portions there are secured by upper and lower rings 12 and 13, respectively, tubular handle elements 14 and 15. The ends of the back-turned portions of the frame 10 are suitably recessed to permit the grasping by the operator, of the tubular handle members 14 and 15, with a firm grip.

Mounted upon the upper central portion of the frame is a camera of conventional type comprising the holder of an element having a sensitive surface, i. e. of a film or photographic plate, and an objective, one of which parts being movable relatively to the other for the purpose of focusing. In the drawings, a camera 16 of the roll-film type has been illustrated. Such conventional camera, in order to apply the same to my inventive structure, has had removed therefrom the lens, lens housing, and lens and shutter supporting structure. In place of such mechanism, there is suitably applied to the front of the camera, a laminated block of metal 17 having on the front face thereof a disc 18 provided with a horizontally disposed rectangular aperture 19. Extending from the disc 18 are two lugs 20 and 21 which are adapted to enter into arcuate slots 22 and 23 provided diagonally opposite each other upon a ring 24 secured to the frame 10. Mounted upon the frame 10 and so as to extend horizontally along the same towards the ring 24 is a leaf spring 25 having a head 26 extending vertically over the end thereof.

In mounting the camera, as modified in accordance with the above, it is placed in juxtaposition with the ring 24 so as to have the lugs 21 and 23 enter the circular enlargement of the arcuate slots 22 and 23. The camera is then given a slight turn to cause the lugs 20 and 21 to ride within the slots 22 and 23 until the head 26 of the leaf spring 25 is cleared by the laminated block 17, the head being then brought by the spring 25 into a position overlying, and in abutting relation with, the top surface of the laminated block so as to secure the camera in position against rotative movement. The block 17 is formed of laminations so as to provide a recess for the entry between the two flat metal members constituting the block of a screen, preferably of metal, 27, which screen, when the camera is not being used, serves to close the aperture 18, preventing light from reaching the film contained within the camera. It will be understood, of course, that just prior to the use of the camera the screen 27 is to be removed by withdrawing it from its position within the laminated block.

Thus, it will be apparent that that portion of the camera which constitutes the holder of the plate or film can be fixedly and stationarily attached to the frame 10, and will be so attached while the apparatus is in use.

The lens or objective 28 of the camera, in the illustrated embodiment, is positioned, with the shutter 29, within a tubular housing 30 having a flange 31 by means of which it is secured to the front face of the frame 10. Within the housing 30 is mounted, for sliding movement therein, an objective and camera shutter supporting telescopic member 32. Extending rearwardly of such telescopic member is a cooperating pair of telescopic rings 33 and 34 which are surrounded by a spring 35 abutting against the rear flange of the telescopic ring 34. Longitudinally along the periphery of the lens housing 30, and extending through a portion thereof, is an elongated slot 36, through which extends, for movement in such slot, a pin 37. From an inspection of Fig. 4, it should be clear that the objective 28 is movable in the direction of its axis relatively to the camera part 16, and that any movement of the pin 37 within slot 36 will cause the telescopic movement of the member 32 and of the cooperating rings 33 and 34 against the tension of the spring 35, and that when restraint against pin 37 is removed, the spring 35 will cause the telescopic member and cooperating rings to move in the opposite direction, thereby causing movement, axially of the lens housing, of the lenses and camera shutter. The position of the pin 37 thus controls the distance of the lenses 28 from the surface of the film contained in the camera, and therefore the focusing of the camera.

Means are provided for automatically focusing the apparatus according to my invention be it that it is intended to photograph an object area of a desired size, be it that the distance between camera and object is pre-selected. These means applied in the embodiment of Figs. 1 to 5 will be hereinafter described.

Secured to the frame 10 by means of a bolt 38 is a cylindrical shaft 39 having an extension 40, the outer end of which is provided with threads 41. For positioning upon the shaft extension 40 is a hub 42 extending rearwardly from a projection 43 of a metal ring 44. Such metal ring, when the hub 42 is placed over the shaft extension 40, is adapted to ride upon the external surface of the lens housing 30. Secured to and extending from the ring 44 at diametrically opposed points upon such ring, are two focus determining rods 45 and 46, respectively, having at the free ends thereof contact members 47 and 48 for utilization as hereinafter described. The opposite ends of the rods 45 and 46 are provided with threads 49 and 50, respectively, engaged by sleeves 51 and 52, the end of the rods, by means of the threading 49 and 50, passing through appropriately threaded apertures in the ring 44.

Figures 4, 5:
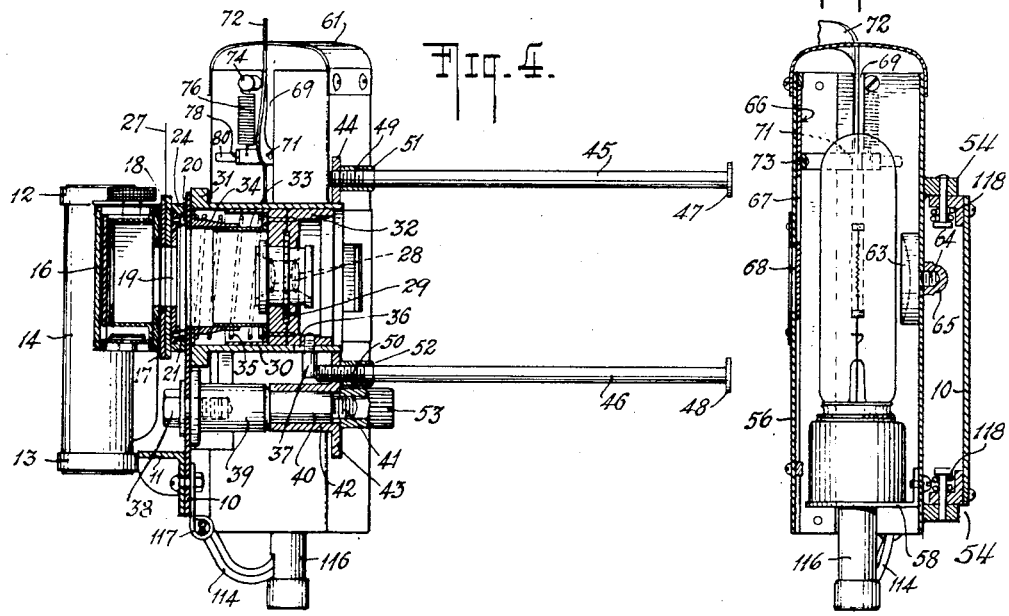
Fig. 4 is a section on the line 4—4 of Fig. 1.
Fig. 5 is a section on the line 5—5 of Fig. 3.

The threading 50 on the rod 46 will be seen from Fig. 4 to extend farther along the end portion of the rod 46 than the corresponding thread on rod 45. Thus, the end of the rod 46 is adapted to abut the pin 37 to cause movement of such pin within the slot 36 in the lens housing. Consequently, when the ring 44, carrying the rods 45 and 46, is placed into position, the focusing of the camera is automatically accomplished, as the length of the threaded end 50 is determined in such a way as to correspond exactly to the length of the rods 45 and 46, thus bringing the objective 28 in the position necessary for focusing. In order to secure the ring 44 firmly about the objective housing, a knurled cap 53 is provided which is internally threaded to correspond with the threading 41 upon the end of the shaft extension 40.

It will be understood, of course, that the length of the rods 45 and 46 with its end 50 is determinative of the distance from the area to be photographed to the focal point of the objective. Furthermore, ring 44 with rods 45 and 46 may be exchanged for a similar member with rods of greater or smaller length. In each instance, however, the relation of the length of the rod portion protruding forward of ring 44 to the length of the rearwardly protruding end 50 of rod 46 is to be selected according to the focal properties of the objective 28. The correct relation can be readily determined by experiment or calculation. In many cases, however, the user of my apparatus will select the area of an object to be photographed rather than the distance from which the picture is to be taken. In other words, the user will intend to reproduce an object area of desired size completely on the area of the sensitive surface available for an exposure. For this purpose, I prefer so to select the spacing of the ends 47 and 48 of a pair of coordinate rods 45 and 46, that they define points or parts of the contour of the area of an object which will be reproduced on the sensitive surface when the ends of the rods coincide with the plane of said object area. Since the size of an image produced in a camera and the object distance are correlated quantities, the correct spacing of the rod ends can be determined as well as the pertaining length of the aforementioned rod portions. In order to make interchangeable rings 44 of equal size useful for rods determinative of various object areas, the rods may be bent in a manner similar to that of rod 145 in Fig. 8. It will be understood that instead of making ring 44 with rods 45 and 46 interchangeable the same result may be attained by exchanging only the pairs of rods 45 and 46 which are screwed into the ring.

It is desirable to make the use of my apparatus independent of external light sources and to create constant conditions with respect to the light quantities applied during exposures so as to avoid the requirement of manipulating a variable shutter or a variable iris, which in the hands of an unskilled user frequently are the causes of unsatisfactory results. For this reason, I provide my apparatus with suitable means for illuminating the object area to be photographed. These means are preferably so constructed and arranged that light rays are directed on the area to be photographed and that the direction is automatically adjusted, if necessary, according to the distance of said area from the objective. Furthermore, means may be provided for preventing light rays from impinging on said area except approximately for the time required for taking a picture. In the illustrated embodiment there are two lamp housings 56 and 57 attached to frame 10. Such lamp housings support within them, upon brackets 58, incandescent lamps 59 and 60. The lamp housings are provided with sheet metal covers 61 and 62, arcuate in shape so as to provide openings at the sides of the housings for ventilation. At the rear of each lamp housing, opposite the filament of each lamp, is a reflector 63 of any usual construction and configuration. Such reflectors may appropriately be supported by means of set screws 64 entering into correspondingly threaded receptacles 65.

Now, it will be clear, that in the position shown in Fig. 1, the rays from the lamps are so directed as to illuminate an object area coinciding with the ends 47, 48 of the rods 45, 46, respectively. However, when rods of different lengths are used it may happen, that the rays are not properly concentrated on such area if the direction of the rays is fixed. For this reason, I prefer to apply means for changing the direction of the rays according to and coincidentally with the focusing. This is accomplished in the illustrated embodiment by adequately swivelling the lamp housing. For this purpose, the lamp housings are pivoted at 54, and 55 and springs 118 are provided which tend to turn housing 56 in clockwise direction and housing 57 in anti-clockwise direction, so that their inner rear edges 119 and 120 abut against frame 10. Ring 44 has two cam-like lateral projections 121 and 122 adapted to engage the respective inner forward edges 123 and 124 of the lamp housings 56 and 57 whereby the housings can be turned against the restraint of the springs 118. The cams 121 and 122 are so shaped and dimensioned that they turn the light housings 56 and 57 when ring 44 is put into place so as to direct the rays on the area determined by the rod ends 47 and 48. It will be understood that a ring 44 carrying longer rods 45 and 46 will require higher cams than a ring 44 having shorter rods owing to the fact that in focusing a camera on an object the object area reproduced on the sensitive surface generally increases at a higher rate than its distance from its image obtained on said surface.

In using the apparatus for the mentioned purposes, particularly in taking the picture of an eye, it is highly desirable that the object area to be photographed is exposed to the strong light of the lamps as shortly as possible.

For this reason, means are provided to apply only short flashes during the time of the exposure which may be of the order of 1/50 of a second.

In the embodiment of Figs. 1 to 5, each of the lamp housings 56 and 57 is provided with a shutter plate 66 having an aperture 67, which is adapted to be brought opposite a correspondingly configured aperture 68 in the forward face of the housing, when a picture is to be taken.

The sides of the lamp housings facing the center line of the structure are provided with slots 69 and 70 extending from the upper end of the housing to a point opposite the lower edge of the aperture 68 in each housing.

Secured to each of the shutter plates 66 is a bent bar 71 to which, opposite the slots 69 and 70, is secured the end of a saddle member 72 by means of its leg portions 73 having portions thereof extending into the slots 69 and 70, the remaining portion of the saddle member extending upwardly along the inner sides of the lamp housings and then across the space between the two housings. The saddle member 72 may be slightly flexible and curved as shown in Fig. 1 in order to allow for the slight differences in the spacing of the housings owing to the spreading action of the cams 121 and 122. At one side of each of the slots 69 and 70 are secured pins 74 and 75 extending outwardly therefrom, to which are secured the upper ends of springs 76 and 77 respectively. The lower ends of the springs 76 and 77 are secured to angle extensions 78 and 79 of the bars 71 and upon the inwardly bent end portions of such extensions are provided pins 80 and 81.

In order to set the lamp shutters for operative condition, in which condition they are in their lowermost position within the lamp housings, the saddle member 72 is pushed down against the tension of the springs 76 and 77 until the pins 80 and 81 are caught beneath the noses of two triangular latch members 82 and 83 upon the ends of leaf springs 84 and 85, the lower ends of the latter being secured by angle brackets 86 and 87 to the frame 10.

Extending transversely of the frame below the lens housing 30 and straddling the two leaf springs 84 and 85, which are positioned within slots therein, is a horizontally disposed lever 88 secured, for a slight sliding movement of its extension 90, upon the front face of the frame 10. Such extension for this purpose is provided with elongated slots 91 through which extend screws 92 secured in the frame. The end of the lever extension 90 has an angularly disposed operative head 93 against which is adapted to slide a similarly angularly disposed extension 94 of a vertically slidable member 95 having elongated slots 96 therein permitting vertical movement of the member upon the surface of the frame. The lower extremity of the vertically slidable member 95 extends outwardly from the frame below the handle 15 containing the shutter operative switch. This lower portion of the slidable member has a projection 97 extending upwardly for abutting relation with a disc 98 housed within the handle 15 (see Fig. 3). This disc is secured by a pair of screws to an outer cylindrical member 99 surrounding an inner tubular member 100, the upper portion of which is enlarged at 101 to provide an abutment for the upper extremity of a spring 102, the lower extremity of the spring abutting against an annular block 103. Within the bore of the tube 100 is positioned the cable 104 of the conventional camera shutter release mechanism, the cable having a push button 105 extending from the upper end thereof, which push button is adapted to be operated by means of a pin 106 surrounded by a spring 107 by the depression of a switch button 108 extending from the upper end of the handle. Upon pressure being applied to the switch button 108, the push button 105 is first depressed, the pin 106 operating the camera shutter cable release. Thereafter, upon further movement downwardly, of the switch button 108, the plunger portion 109 of the switch button abuts the upper end of a tubular member 110 seated upon the enlargement 101 of the tube 100, causing depression of the tube and of the disc 98, which in turn causes a depression of the extension 97 of the vertically slidable member 95. As such slidable member 95 is depressed, the angular extension 94 thereof causes a slight horizontal movement of the lever extension 96 and of the lever 88 to cause release of the pins 80 and 81 from the latch members 82 and 83. Upon release of such pins, the saddle member 72 will be pulled abruptly by the springs 76 and 77, to its upper position, thereby operating the lamp shutters by momentarily bringing the apertures 67 in the shutter plates 66 opposite the apertures 68 in the housings. Return of the vertically slidable member 95 upon depression thereof is effected by means of a wire spring 111, one end of which extends through an aperture in the heel of the extension 94, the other end of which, after being coiled about a bolt 112, is anchored in the frame 10.

Mounted within the lamp housings are a pair of lamps 59 and 60, current to which is supplied by wires 114 passing through a conventional lamp switch 115, the wires being anchored within a pair of tubular supports 116, the wires also being secured to the frame by means of a bracket 117, so that they are supported out of contact with the surface upon which the camera structure might be positioned.

It will be noticed that separate switches 108 and 115 are provided for operating the shutters and for lighting the lamps, although the expert may easily find a structure in which both said switches are combined. However, I prefer to separate the switches and to place them in reach for manipulation with one and the same finger in order to create a short time interval between the operation of switches 115 and 108 so as to allow the incandescent lamps to attain their full power prior to the opening of the shutters. This, however, is no requirement, and in many instances, another arrangement of the switches may be useful.

The operation of my apparatus is as follows:

Upon determining the area of the surface, for instance, of the skin of a patient, which is to be photographed, the operator selects from a plurality of attachments, supplied with the automatic camera, a set of rods 45 and 46, the contact members 47 and 48 of which are spaced from each other according to the contour of the area to be photographed. Such rods may be supplied preferably in position upon a ring 44 and are of a length determining the proper distance of the objective from the object area to be photographed. The ring 44, carrying the rods 45 and 46, which has thus been selected, is secured in place upon the device by placing the hub 42 thereof upon the shaft extension 40. The knurled cap 53 is thereafter positioned upon the threaded end of the shaft to maintain the ring 44 and the rods 45 and 46 in position upon the device.

It will be noted that the camera objective and shutter are supported in the telescopic housing 32 at the greatest distance from the sensitive surface within the camera, by the spring 35. When the ring 44 is applied to the structure, the inner end 50 of the rod 46 will abut the pin 37 and cause the telescopic member 32 to move inwardly against the tension of the spring 35 to the exact position in which the camera is correctly focused both with respect to the distance of the lens from the object or area to be photographed, and with respect to the distance from the film. Upon the completion of this operation, the camera has been automatically focused. Simultaneously, however, the cams 121 and 122 will have spread the lamp housings 56 and 57 so far apart that the light rays from the lamps in these housings will be so directed as to illuminate the object area completely after the light has been switched on and the light shutters have been opened.

The operator now connects the plug at the end of the wires 114 (not shown) to an ordinary household current outlet. The saddle member 72 is then depressed by the operator, causing the pins 80 and 81 to engage the two latch members 82 and 83. The device, held by the operator by means of the handles 14 and 15, is then brought to a position in which the contact members 47 and 48 abut the contour of the area to be photographed, for instance, the body of the patient, either the skin or, for instance, in photographing the interior of the mouth, in such position that the two contact members 47 and 48 straddle the open mouth. The switch 115 is then put on, conveniently by the thumb of the operator, and the two lamps 59 thus illuminated. Immediately after this operation, the switch button 108 is depressed by the thumb of the operator, the depression of such switch, in its downward movement, causing the opening of the camera shutter as the plunger 109 depresses the push button 105 against the spring 106, the further movement downwardly of the plunger 109 causing sliding movement downwardly of the tube 100 and of its enlargement 101 against the tension of the spring 102 so as to give a slight downward movement to the disc 98. This slight movement of the disc 98 is sufficient to depress the extension 97 of the vertically slidable member 95, so that the angular extension 94 thereof causes movement in a horizontal direction of the lever 88 which in turn releases the pins 80 and 81 from beneath the latch members 82 and 83. This release is caused by the movement sidewise of the leaf springs 84 and 85 by the sidewise movement of the lever 88. As the pins 80 and 81 are released, the saddle member 72 is brought abruptly to its upper position by the springs 76 and 77, thus causing the abrupt upwardly sliding movement of the shutter plate 66, in the course of which movement the shutter aperture 67 has been brought momentarily (for the time of the exposure) opposite the housing aperture 68, so that the illumination from the lamps 59 is directed through such shutter apertures against the area being photographed.

Upon the completion of these operations, the release of the switch button 108 will automatically cause the shutter of the camera to be closed, so that upon the turning of the film in the camera to the next exposure position and the depression of the saddle member 72, the apparatus is again in condition to take the next succeeding photograph. If a series of photographs upon a roll of film is to be taken, the lamps may be maintained in an illuminated condition throughout the taking of such series and the lamp switch 115 brought to its off position upon completion of the series.

In my novel apparatus the camera diaphragm may be fixed, for instance, for good results, at 1:32, although any other suitable diaphragm opening may be conveniently used. In most instances, here under consideration, no variable diaphragm will be required because I make use of a law of nature which is helpful to maintain substantially constant or at least sufficiently constant lighting conditions independent of the distance of the object within the limits established by the purpose hereinbefore stated. In this respect it will be noticed that, in focusing the camera, the plane of the image con be considered as fixed and that the focus of the light source is also fixed in relation thereto, whereas the distances of the objective and of the object from the plane of the image are variable in accordance with the size of the object area to be photographed. Hence, the light intensity will decrease with the increase of the distance of the object. However, with an increase of the size of the object area, its distance from the plane of the image increases at only an appreciably lower rate, and simultaneously the distance of the objective from the plane of image decreases at a rate even higher than that of the increase of the distance of the object. As a result, the aperture angle of the objective, or the cone of rays having the object area as a base and the center of the objective as its apex, becomes larger when the object area increases. These facts have for a combined result, that the light quantity applied to the sensitive surface will vary only slightly when the size of the object area is varied within certain limits, and that neither a variable shutter speed nor a variable iris will be required.

No great care on the part of the operator in selecting the exact ring 44 and the rods 45 and 46 carried thereby, need necessarily be exercised, as the depth of the focus is slightly more than 4 inches, so that a clear and distinct photograph may be secured with a rod length which is not precisely that corresponding to the focus desirable for the optimum result, as there is a possible leeway of approximately 2 inches to either side of the contact members 47 and 48. Thus, a clear and distinct photograph may be secured by means of my novel apparatus of all parts of the object being photographed which are within a distance of 2 inches on either side of the contact members 47 and 48. For this reason, if the apparatus is being used to take a photograph of the mouth, a clear and distinct image of the teeth as well as of the pharynx will be secured.

The embodiment illustrated in Figs. 6 to 15 is built according to principles similar to those applied in the embodiment of Figs. 1 to 5. It is preferable to the latter inasmuch as it is simpler in structure, although it is somewhat more bulky. A skeleton frame 200 comprises a base plate 201 and side wall members 202. Removable wall panels 203 and a removable top 204 may be provided to encase the apparatus mounted on the frame 200. On the base plate 201 a number of pillars 205 are erected which carry a platform 206 secured to the pillars by suitable means such as screws 207. A bracket 208 is mounted on platform 206 so as to carry in fixed relation thereto a photographic objective 209 with a shutter mechanism 210. On its lower surface, platform 206 is provided with two guide rails 211 which extend parallel to the axis 212 of objective 209. In engagement with the guide rails 211 is a carriage 213 which has a rearward extension 214 with a bracket 215 thereon. Bracket 215 carries a camera housing of suitable type adapted to receive therein an element having a light-sensitive surface (not shown), housing 216 being secured to bracket 215 by suitable means such as screws 217. A bellows 218 connects the objective 209 to the housing 216. Now it will be apparent, that the housing 216 with a film or plate therein may be moved relatively to the objective 209 in the direction of axis 212 in order to set a desired focal distance of a sensitive surface from the objective. A spring 219 is tensioned between the brackets 208 and 215, so as to shift housing 216 into its end position in which the distance between the objective 209 and the sensitive surface within the housing is a minimum. Means are provided for focusing the apparatus according to an object area of selected size. In the illustrated embodiment, such means consist of a bent member 220 whose forward end carries a mask 221 determinative of the size of the object area to be photographed. On the longitudinal extension of member 220, a socket 222 is secured by means of a pin 223. The socket has a rearward flange 224 with wing-like projections 225. A receiving member 226 is secured to the front wall portion 227 of the apparatus and so recessed as to allow a bayonet-like connection of members 220 and 226. In the rear of member 226, apertured at this place, a guide sleeve 228 is fastened to wall portion 227, and the rearward end 229 projects from sleeve 228 when connection is established between flange 224 and the part 226. The end 229 is adapted to engage a front plate 230 secured to the forward end of carriage 213 for instance by screws 231. Thus, if member 220 selected from a group of similar members according to the size of the mask 221, is inserted through 226 and sleeve 228 it will push carriage 213 and hence housing 216 backward according to the length of the projecting end 229, as far as flange 225 permits when engaging part 226. It will be understood that member 220 is so dimensioned that the center of the mask 221 coincides with the axis 212, and that the axial spacing of the mask 224 from flange 225 and the length from the flange 225 to the rearward end of member 220 determine correct focal distances of the object coinciding with the mask plane and of the image receiving sensitive surface from the objective 209.

The mask shown in Figs. 8 and 12 is useful in most cases. In certain instances, e. g. for taking a picture of an eye I prefer the form shown in Figs. 14 and 15 wherein the upper rim 222' of the mask 221' is bent off forward and the lower rim 223' is bent rearward, the latter being inserted in an upright arm 224' of the member 220'. In other cases, it may be desirable to use a pair of rods similar to the rods 45 and 46 in Fig. 4. While one of the rods may be provided with an attachment device such as shown with respect to member 220, the other one indicated at 145 in Fig. 8 may have an end adapted for insertion into a sleeve 232 secured to the upper portion of the front of the apparatus.

In order to illuminate the object area on which the apparatus is focused, only one light source is required in the structure illustrated in Figs. 8 to 12. A lamp housing 233 is erected on the base plate 201 and laterally of the platform 211. A chimney 234 with air vent 235 is adapted to close the top of the lamp housing 233. On the bottom of the housing, there is a socket 235 to receive therein an incandescent lamp 236. A plug 237 is provided with wires 238 connecting thereto a light switch 239 which is attached to the lamp-housing, wires 240 leading from the switch to the socket 235. Thus, if an external source is connected to plug 237, electric current may be supplied to lamp 236 under the control of switch 239. Collector lenses 241 are secured in the side wall of housing 233 by means of a mount 242 in such a position as to throw a light beam in a direction at right angles to the objective axis 212 and intersecting said axis in front of the objective. In the path of said light beam and in front of said objective, a mirror 243 is erected on platform 206 by means of a mount 244, and generally held at an angle of 45° with respect to the objective axis and the light beam. The mirror 243 is provided with a central opening 245, or if the mirror consists of glass, with a central portion lacking the reflecting layer, whereby a light beam emitted from lamp 236 will be reflected by mirror 243 upon the object area defined by mask 221, and, pass from there through aperture 245 so as to strike the objective 209 when the shutter 210 is open. It will be noticed, that no adjustment of the illuminating array is required in the embodiment of Figs. 8 to 12 since the light beam is axially directed and will thus impinge on the object area no matter how the distance of the latter from the light source is changed.

However, in certain instances particularly if a colored picture of an eye is to be taken, the true central direction of the light beam incident on the eye would not be desirable owing to a well known effect according to which the pupilla would appear red in the picture. For this reason, I prefer to apply means for slightly deflecting the light beam when pictures of the mentioned type are to be taken. In the instant embodiment, this is accomplished in the following manner. The mirror mount 244 is secured to the platform 206 by means of a pivot 246, and a spring 247 bearing against the rear side of the mirror and against a fixed bracket 248 tends to urge the mount 244 against a stop 249 in which position the mirror is at 45° with respect to the objective axis 212. A flexible member 250 connects the mirror mount at 251 with the camera housing 216 at 252. Member 250 has sufficient slack so as to become tight only when the camera housing is displaced a certain distance from the objective. When the housing 216 is shifted still further away from the objective, member 250 will swing mirror 243 out of its 45° position. Since, in general, a human eye approximately constitutes the smallest object area to be photographed, and since the smallest object area requires the largest distance of the sensitive surface from the objective, the aforementioned device is suited to serve the purpose. If on the other hand, objects of small size are to be photographed with central illumination, the member 250 may be released from its connection to the mirror and for the housing, whereupon the mirror will remain in its 45° position independent of the distance between housing 216 and the objective.

It may happen that vagrant rays from the lamp 236 passing through aperture 245 are reflected from interior surfaces of the apparatus so as to enter the objective. In order to avoid the occurrence of such harmful rays it is advisable to arrange a black and reflecting surface 253 in the rear of mirror 243 opposite lamp 236 and in registry with aperture 245, the plane of said surface 253 being arranged at an angle with respect to the plane of mirror 243, and being constituted by a glass plate with a black coating 254 of its rear. The black surface will absorb most of said vagrant rays whereas the remainder will be reflected by the glass in a direction other than towards the objective 209. In order to facilitate the focusing of the apparatus on an object a view finder may be arranged in connection with my apparatus. This may be accomplished by mounting a plane glass plate 255 by means of a support 256 on the platform 206 so that the plate is located in front of the objective and at an angle of 45° with respect to the horizontal plane as shown in Fig. 8. Above plate 255, the top 204 is provided with an aperture 257, and, in registry therewith a 45° mirror 258 is arranged in a housing 259 open at its rear end at 260.

In order to give sufficient light during the viewing, an auxiliary lamp 261 may be provided on platform 206, which lamp may receive current from a source not shown. Now, it will be apparent that at least a portion of the light rays reflected from the object area to which the apparatus is applied with the mask 221, will be reflected from plate 255 towards mirror 258 so as to produce thereon an image of the object visible through the opening at 260, whereas the remainder of the light rays from the object in fact the major portion thereof will pass through the plate 255 towards the objective 209.

The shutter arrangement in my apparatus comprises two units one of which being the objective shutter 210 and the other one a lamp shutter, generally denoted with 261. Both shutters are operative by means of a push button 262 shown in detail in Fig. 13. The release of shutter 210 comprises a hose 263 with a wire 264 therein and projecting with its end 265 against the face 266 of push-button 262 so that the shutter remains open as long as button 262 is pushed in. The shutter mechanism 261 comprises a bracket 267 secured to the wall of the lamp housing 233, for instance, with screws 268. The bracket 267 embodies the bearings for a shaft 269 carrying a grip 270 on its end protruding from the side wall covering 203 of the apparatus. Secured to the shaft 269 near its other end 272, is a disc 271 adapted to rotate in front of the collector lenses 241. A flexible member 273 is fastened to the end 272 and wound a few turns about the latter as clearly shown in Figs. 9 and 10. The free end of member 273 is attached to a spring 274, and spring 274 is hooked to an eyelet 275 of the skeleton frame 201. Hence, spring 274 exercises a torque on shaft 269 so as to rotate the disc 271 which is provided with an aperture 276 so arranged as to pass the collector 241. The disc is furthermore provided with a notch 277 on its periphery and with a pin 278. A bracket 279 secured to the lamp housing 233 carries a member 280 of resilient material and so bent as to receive therein the aforementioned pin 278 and to brake the movement when the pin is about to enter into member 279 owing to the torque created by spring 274, i. e. upon rotation of the disc 271 in the direction of the dash-line arrow in Fig. 10. Also secured to the housing 233 is a guide 281 for a detent 282 which normally bears against the periphery of 271, thus tending to enter notch 277 under the action of a small spring (not shown) in the attachment 283 of a release of a type similar to that described in connection with shutter 210. This release comprising a hose 284 and a wire 285 is under the control of the same push button 262 which operates the release of shutter 210. However, it will be noticed that the end 286 of wire 285 is slightly spaced from the button face 266 when the button is in its operative position shown in Fig. 13. Now, it will be apparent that the disc 271 may be turned, by manipulation of the grip 270, clockwise in Fig. 10 almost one entire turn until detent 282 enters into notch 277 thereby locking the disc in such position. Simultaneously, an additional portion of member 273 will have been wound on shaft 269, thus tensioning spring 274. If now push button 262 is pressed down, it first actuates the shutter 210 so as to open it with the aid of the release wire 264 by acting upon the wire end 265. When the inward movement of button 262 continues also the wire end 286 will be engaged by the button so as to lift detent 282 out of notch 277. As soon as this happens, the disc will be rotated by the action of spring 274 until the rotation is braked and finally stopped by pin 278 entering member 280. During the rotation of disc 271, the aperture 276 will have passed the collector lenses 241 thus permitting a flash of light from lamp 236 to impinge on mirror 243. The duration of said flash can be adjusted within certain limits by pre-tensioning spring 274, for instance, by increasing or decreasing the number of turns of the member 273 wound about shaft 269.

It has been indicated hereinbefore that the apparatus according to my invention does not require an operative means for varying the quantity of light passing the objective during an exposure. However, in certain cases such means may be desirable. As it is well-known in the art, such variation may be accomplished by a change of one or several of the three factors, viz. power of the light source, time of exposure, and aperture of the objective. In the accompanying drawings, an example of an adequate structure is illustrated which comprises a variable iris 281. Consistent with the object of the invention means may be applied to vary the iris according to the distance of the objective from the sensitive surface in the camera housing and in such a manner that the objective aperture will be smallest when the objective is farthest remote from the sensitive surface, and will increase when the distance of the objective from the sensitive surface decreases. The exact law according to which the diaphragm opening should change can be easily found by calculation or by experiment, and it will be understood that such change may be obtained either stepwise or progressively. In the embodiment of Figs. 6 to 12, a particularly simple means is shown for changing the aperture of the iris 281. The iris is provided with the conventional control lever 282 to the end of which a flexible member 283 is attached. The member 283 is guided by a roller 284 secured to the bracket 208 and is connected with its other end to the bracket 215 which supports the camera housing 216. A spring 285 is so arranged as to urge lever 282 into that position in which the iris opening is a maximum. Now, it will be clear that lever 282 will be pulled, against the restraint of spring 285, towards the position of minimum iris aperture the farther the housing 216 is pushed back from the objective 209.

The operation of the embodiment shown in Figs. 6 to 15 operates in the following manner:

The user of the apparatus will select a suitable attachment member 220 according to the desired size of the mask 221. He will insert this member into sleeve 228 and push it inward and so turn it that the bayonet connection of flange 224 to the member 226 is established. In this position the center of the mask 221 coincides with the objective axis 212. Coincidentally with the attaching of member 220 to the apparatus, all necessary adjustments are automatically accomplished, that is to say, the housing 216 will be correctly spaced from the objective according to the length of the portion 229 of member 220 pushing carriage 213 backward, and, if a variable iris is provided the latter will be set with the aid of the member 283. Similarly, mirror 243 will be turned out of its 45° position with the aid of member 250, if the size of the selected mask 221 is small i. e. if the portion 229 is sufficiently long, as in the case of an eye to be photographed.

Thereafter, the user will turn grip 270 until detent 282 falls into notch 277 of the shutter disc 271, and connect plug 237 to an external source of electric current. Now, the apparatus is ready for taking a picture provided an element, film or plate, with its sensitive surface in housing 216 is in a position for an exposure. The apparatus is, then, applied to the object to be photographed in such a manner that the mask 221 surrounds the desired area. Looking through the aperture 260 of the viewer device the user is able to ascertain that the apparatus is correctly held with respect to the object, which if necessary may be illuminated for this purpose by the auxiliary lamp 261 of small power. Now, the lamp 236 may be lighted by pressing the "on" button of switch 239, and a subsequent pressing of push button 262 will first open shutter 210, and, immediately thereafter, release shutter disc 271. When button 262 is released shutter 210 will close the objective 209. Finally the "off" button of switch 239 may be operated to extinguish the light of lamp 236.

Figs. 17 to 19 illustrate modifications of certain features which, however, do not alter the hereinbefore described principle and operation of the apparatus according to my invention. In the modified form, platform 206 is provided, on its lower side, with two guiding sleeves 311 for a carriage comprising two rods 313 connected by a front plate 330 and a rear plate 331 to which the bracket 315 carrying housing 216 is secured. Attachment member 320 which carries the mask 221 has a square cross-section as clearly shown in Fig. 17 and a recess 322 on its lower side. A plate 233 is secured to the lower front portion of platform 206, and provided with a square sleeve 324 in registry with an opening in plate 323. Sleeve 324 is adapted to receive therein member 320 whose recess 322 may be brought into a recess in sleeve 324. A latch 325 with a projecting knob 326 is pivoted at 327 and adapted to enter, under the action of a spring 328, the recess in the sleeve 324 and, thus, also the recess 322 of member 320, so as to lock the latter in its predetermined position in which member 320 bears against the carriage front plate 330. By pressing knob 326 member 320 can be released so as to be exchanged for a similar member. Figs. 17 to 19 further show a modified form of the shutter release mechanism. A rod 340 is vertically guided in the bracket 208 supporting the objective 209. A wire 341 so connects the shutter lever 342 to rod 340 so that the shutter will be opened when rod 340 is lifted. A bent rod 343 is vertically guided in a bracket 344 secured to the lamp housing 233. Rod 343 is attached to rod 340 with the aid of a connecting piece 345, and a spring 346 is so arranged as to pull rod 343 downward into its lowest position which corresponds to the "closed" position of the shutter lever 341. The shutter disc 271 for the lamp housing has secured to its periphery, a cam 347 with a radial projection 348 and a notch 349 between projection 348 and a slope 350. Another bracket 351 with a soft rubber cushion 352 serves as a braking stop for the projection 348 when disc 271 is rotated in the direction of the arrow in Fig. 19 owing to the action of spring 274 as hereinbefore described. An arm 353 of a lever 354 passing through the lamp housing 233 and pivoted in its walls is adapted to climb the slope 350 and to engage notch 349 in order to lock the disc 271 in its position ready for operation. The other arm 355 of lever 354 is engaged by a spring 356 tending to force arm 353 into said notch 349. Another lever 357 pivoted in the walls of the lamp housing has an arm 358 provided with a push button 362 projecting from the apparatus. A spring 363 secured to the lamp housing by means of bracket 364 tends to urge arm 358 outward against a stop 365. The other arm 359 lies underneath the lower end of rod 343 and of arm 353 of the other lever 354, and the arrangement is such that upon actuation of the button 362, rod 343 will be slightly lifted before arm 359 engages arm 353 to lift the latter out of the notch 349. Thus, operation of button 362 accomplishes the same result as the pressing of button 262 in the embodiment of Figs. 6 to 15, meaning that the objective shutter will be opened shortly before the lamp shutter disc is rotated. In every other respect, the form shown in Figs. 17 to 19 corresponds to that of Figs. 6 to 15.

Thus, it will be apparent from the hereinabove description that the illustrated embodiments are suited examples of solutions of the inventive problem, contemplating the provision of a photographic camera in which any adjustments required as to the focusing and to the lighting conditions are automatically accomplished by merely attaching to the camera a member selected from a set of similar members according to the object area to be photographed, and by so placing the camera that a projecting end of the selected member coincides with the plane of said area or with at least a portion of the area contour.

It will be understood by those skilled in the art that various changes in the specific form of my novel apparatus, particularly in the arrangement and configuration of the several parts thereof, may be made without departing from my invention. I desire it to be understood that my invention is limited, not by the particular disclosure of the specific embodiment thereof illustrated and described hereinabove, but by the scope of the appended claims, it being recognized by me that various changes in addition to those hereinabove suggested and indicated, may be made in the construction and operation of my apparatus.

I claim:

1. A focusing device for a photographic camera including an objective part and a holder part for an element having a light-sensitive surface wherein one of said parts is movable relatively to the other one in the direction of the objective axis, comprising a detachable member extending generally in the direction of said axis when in operative position, said member having one portion adapted to be attached to said other camera part, a second portion adapted to shift said movable camera part into a predetermined relative position co-incidentally with the attachment of said member, and a third portion projecting forward from said objective a predetermined length and being determinative of an area in focal relation to said camera parts.

2. A photographic-camera comprising an objective part and a holder part for an element having a light-sensitive surface, one of said parts being fixed and the other one movable relatively thereto in the direction of the objective axis, said fixed part having means for the selective attachment of any one of a series of focus-setting members each of which having a first portion adapted to shift said movable camera part into a predetermined relative position co-incidentally with the attachment of said member and a second portion so formed as to extend generally in the direction of the objective axis forward from said objective when attached and to determine an area and distance of an object, and differing from the others in the relative lengths of said portions according to the photographic objects for which they are respectively destined, and said movable part having means to co-operate with the first portion of such member in the focal adjustment of said camera according to object area and distance determined by the second portion of the particular member.

3. In a camera including an objective part and a holder part for an element having a light sensitive surface wherein one of said parts is fixed and the other one movable relatively thereto in the direction of the objective axis, the combination of means in connection with said fixed camera part for the selective attachment of any one of a series of focusing members which differ from each other in relative dimensions of an object area and distance-determining portion and a focus-setting portion, said means including means for holding such member in a pre-determined position so as to project forward from said objective generally in the direction of the objective axis, and means in connection with said movable camera part to co-operate with the focus-setting portion of such member in shifting said movable camera part coincidentally with the attachment of such member.

4. A focusing device for a photographic camera including an objective part and a holder part for an element having a light-sensitive surface wherein one of said parts is fixed and the other one movable relatively thereto in the direction of the objective axis, comprising resilient means in connection with both said camera parts and tending to hold said parts in an end position with respect to their relative distance, and a detachable member having one portion adapted to be attached to said fixed camera part, a second portion adapted to shift said movable camera part into a predetermined relative position co-incidentally with the attachment of said member against the restraint of said resilient means, and a third portion projecting, when in operative position, a predetermined length forward from said objective in the direction of the objective axis and being determinative of an area in focal relation to said camera parts.

5. A focusing device for a photographic camera including an objective part and a holder part for an element having a light-sensitive surface wherein one of said parts is movable relatively to the other one in the direction of the objective axis, comprising a detachable member extending generally in the direction of said axis when in operative position, and being adapted to be attached to said other camera part, and means for emitting light rays to illuminate the object to be photographed, said member having a portion projecting forward from said objective a pre-determined length and being determinative of an area in focal relation to said camera parts, and another portion adapted to shift said movable camera part into a pre-determined relative position and to change the direction of said light rays according to the pre-determined distance of said area from said objective co-incidentally with the attachment of said member.

6. A focusing device for a photographic camera including an objective part and a holder part for an element having a light-sensitive surface wherein one of said parts is movable relatively to the other one in the direction of the objective axis, comprising a detachable member extending generally in the direction of said axis when in operative position, and being adapted to be attached to said other camera part, and operative means for altering the light quantity passing said objective during an exposure according to the focal-setting of said camera parts, said member having a portion projecting forward from said objective a pre-determined length and being determinative of an area in focal relation to said camera parts, and another portion adapted to shift said movable camera part into a pre-determined relative position and to adjust said operative means according to the pre-determined distance of said area from said objective coincidentally with the attachment of said member.

7. A focusing device for a photographic camera including an objective part and a holder part for an element having a light-sensitive surface wherein one of said parts is movable relatively to the other one in the direction of the objective axis, comprising a rigid elongated member adapted to be releasably attached to said other camera part intermediate the ends of said member so as to extend generally in the direction of said axis forward from said objective when attached, and means for securing said member in attached position, the rear end of said member being adapted to shift said movable camera part into a pre-determined relative position co-incidentally with the attachment of said member, and the forward end of said member being determinative of an area in focal relation to said camera parts.

8. A device as claimed in claim 7 further comprising a substantially ring-shaped part adapted to be releasably attached to said movable part so as to embrace said objective when in operative position, the rear end of said member being screw-threaded and adapted to be screwed into the wall of said ring so as to project rearwardly therefrom a pre-determined distance and to engage said movable camera part.

9. A device as claimed in claim 7 further comprising a mount for said other camera part, and a bayonet-like connection of said rigid member and said mount, so located that correct focusing conditions will be established when said member is connected to said mount.

10. A device as claimed in claim 7, further comprising a mount for said other camera part, said mount including guiding means for said rigid member, and said holding means including a latch at said mount, said latch being adapted to engage said rigid member in its said attached position.

11. A photographic camera comprising a frame, an objective fixed in relation thereto, a carriage movable with respect to the objective in the direction of the objective axis, a holder part for an element having a light-sensitive surface, said holder part being mounted on said carriage, resilient means tending to shift said carriage into an end position relatively to said objective, a member adapted to be releasably attached to said frame and extending generally in the direction of said axis when in operative position, said member having a portion adapted to engage said carriage and to shift it against the restraint of said resilient means into a predetermined position co-incidentally with the attachment of said member, and another portion projecting forward from said objective a predetermined length and being determinative of an object in focal relation to said camera parts.

12. In a photographic camera including an objective part and a holder part for a light sensitive surface wherein one of said parts is fixed and the other one movable relatively thereto in the direction of the objective axis, the combination of a member adapted to be releasably attached to said fixed camera part and extending generally in the direction of said axis when in operative position, said member having a portion adapted to shift said movable camera part into a pre-determined position co-incidentally with the attachment of said member, and another portion projecting forward from said objective a predetermined length and being determinative of an object area in focal relation to said camera parts, two opposite light sources laterally of the objective axis, and means operative by said member co-incidentally with its being attached to direct light rays from said sources so as to converge substantially to the center of said area.

13. A device as claimed in claim 12, comprising an apertured housing of each of said light sources, said housing being pivoted about an axis at a right angle to the objective axis, a resilient means adapted to turn said housing into an end position, and a cam-like element in connection with said member and adapted to engage said housing and to turn it against the restraint of said resilient means.

14. In a photographic camera including an objective part and a holder part for a light sensitive surface wherein one of said parts is fixed and the other one movable relatively thereto in the direction of the objective axis, the combination of a member adapted to be releasably attached to said fixed camera part and extending generally in the direction of said axis when in operative position, said member having a portion adapted to shift said movable camera part into a pre-determined position co-incidentally with the attachment of said member, and another portion projecting forward from said objective a pre-determined length and being determinative of an object area in focal relation to said camera part, a light source laterally of the objective axis, and a mirror in front of said objective, said mirror being so inclined relatively to the objective axis as to reflect light rays from said source in a direction substantially parallel to the objective axis towards said area, and having an aperture to permit rays reflected from said area to pass into said objective.

15. A camera as claimed in claim 14 further including means responsive to the movement of said movable camera part for slightly changing the inclination of said mirror so as to slightly divert the reflected rays from their direction parallel to the objective axis when the said camera parts are spaced beyond a pre-determined distance from each other.

16. A camera as claimed in claim 14 further comprising means to prevent rays directed from said light source towards said aperture of the mirror from entering the objective.

17. A camera as claimed in claim 14 further including a black reflecting surface inclined with respect to the plane of said mirror and arranged in the path of direct light rays from said source through said aperture, so as to absorb part of said rays and to reflect the remainder in a direction other than towards the objective.

18. In a photographic camera including an objective part and a holder part for a light sensitive surface wherein one of said parts is fixed and the other one movable relatively thereto in the direction of the objective axis, the combination of a member adapted to be releasably attached to said fixed camera part and extending generally in the direction of said axis when in operative position, said member having a portion adapted to shift said movable camera part into a pre-determined position co-incidentally with the attachment of said member, and another portion projecting forward from said objective a pre-determined length and being determinative of an object area in focal relation to said camera part, an adjustable iris in connection with said objective, and means operative by said member co-incidentally with its attachment, for adjusting the aperture of the iris to a pre-determined size.

19. In a photographic camera including an objective part and a holder part for a light sensitive surface wherein one of said parts is fixed and the other one movable relatively thereto in the direction of the objective axis, the combination of a member adapted to be releasably attached to said fixed camera part and extending generally in the direction of said axis when in operative position, said member having a portion adapted to shift said movable camera part into a pre-determined position co-incidentally with the attachment of said member, and another portion projecting forward from said objective a pre-determined length and being determinative of an object area in focal relation to said camera part, a light source of constant light intensity adapted to illuminate said object area, an adjustable iris, and means operative by said member when being attached, for changing the aperture of the objective so as to maintain approximately equal light intensity at the location of the image in the camera independent of the distance of the image from the object area determined by said member.

GUSTAV BUCKY.